US008003172B2

(12) United States Patent
Kanai

(10) Patent No.: US 8,003,172 B2
(45) Date of Patent: Aug. 23, 2011

(54) PROCESS FOR PRODUCING AN ELECTROPHOTOGRAPHIC BELT

(75) Inventor: Taku Kanai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 103 days.

(21) Appl. No.: 12/500,055

(22) Filed: Jul. 9, 2009

(65) Prior Publication Data

US 2010/0008703 A1 Jan. 14, 2010

Related U.S. Application Data

(62) Division of application No. 11/393,664, filed on Mar. 31, 2006, now abandoned.

(30) Foreign Application Priority Data

Apr. 26, 2005 (JP) ................................ 2005-127976

(51) Int. Cl.

*B05D 5/00* (2006.01)
*B05D 5/12* (2006.01)
*B05D 7/02* (2006.01)
*B32B 27/00* (2006.01)

(52) U.S. Cl. ................ 427/412.1; 427/419.1; 427/419.2

(58) Field of Classification Search ............... 427/407.1, 427/412.1, 419.1, 419.2, 384, 393.5, 377
See application file for complete search history.

(56) References Cited

U.S. PATENT DOCUMENTS

| | | | | |
|---|---|---|---|---|
| 4,100,136 | A * | 7/1978 | Carter et al. | 525/478 |
| 4,526,920 | A * | 7/1985 | Sakashita et al. | 522/78 |
| 5,174,848 | A * | 12/1992 | Yazaki et al. | 156/242 |
| 5,371,150 | A * | 12/1994 | Osawa et al. | 525/326.3 |
| 2004/0146325 | A1* | 7/2004 | Tani et al. | 399/329 |
| 2005/0084788 | A1 | 4/2005 | Yau et al. | |
| 2005/0175911 | A1 | 8/2005 | Tamoto et al. | |

FOREIGN PATENT DOCUMENTS

| | | | |
|---|---|---|---|
| JP | 10-228188 | | 8/1998 |
| JP | 10228188 | A | 8/1998 |
| JP | 11-170389 | A * | 6/1999 |
| JP | 2002-326287 | | 11/2002 |

* cited by examiner

*Primary Examiner* — William Phillip Fletcher, III
(74) *Attorney, Agent, or Firm* — Fitzpatrick, Cella, Harper & Scinto

(57) ABSTRACT

A process for producing an electrophotographic belt is disclosed which includes forming a base layer comprising a thermoplastic resin, and forming a surface layer comprising a cured resin film by applying on the base layer a surface layer forming coating fluid which contains a monomer and/or oligomer component as a raw material for the cured resin film, conductive particles and a solvent, followed by drying and curing to form the surface layer. The monomer and/or oligomer component is dipentaerythritol hexaacrylate.

5 Claims, 4 Drawing Sheets

PROCESS FOR PRODUCING AN ELECTROPHOTOGRAPHIC BELT

CROSS-REFERENCE TO RELATED APPLICATIONS

This application is a divisional application of U.S. application Ser. No. 11/393,664 filed Mar. 31, 2006, now abandoned, which claims priority of Japanese Patent Application No. 2005-127976, filed on Apr. 26, 2005. The contents of all of the aforementioned applications are hereby incorporated by reference herein in their entireties.

BACKGROUND OF THE INVENTION

1. Field of the Invention

This invention relates to an electrophotographic belt (belt for electrophotography) such as a transfer material transport belt or an intermediate transfer belt, used in image forming apparatus which utilize electrophotographic systems, i.e., what are called electrophotographic apparatus, and also relates to an electrophotographic apparatus having the electrophotographic belt, and a process for producing the electrophotographic belt. Monochrome or color (inclusive of full-color) copying machines and printers (such as LBPs) are available as electrophotographic apparatus having electrophotographic belts.

2. Related Background Art

In order to stably reproduce high-grade images by using an electrophotographic apparatus having an electrophotographic belt, it is important to balance the volume resistivity of the electrophotographic belt and the surface resistivity of the surface of the electrophotographic belt on which a toner image or a transfer material is held.

Specifically, taking as an example the case of an intermediate transfer belt, the intermediate transfer belt is required to surely hold on its surface toner images primarily transferred from an electrophotographic photosensitive member, and is further required to allow the toner images held on its surface to be secondarily transferred to a transfer material such as paper in a good efficiency. In order to render such conflicting performances compatible with each other at a high level, it is effective to take into account the balance between volume resistivity and surface resistivity of the intermediate transfer belt.

For example, Japanese Patent Application Laid-open No. H10-228188 discloses that where the surface resistivity and volume resistivity of an intermediate transfer member (such as an intermediate transfer belt) are represented respectively by $10^x$ Ω/square and $10^y$ Ωcm, these are so set as to be $10 \leqq x \leqq 14$, $y \leqq 13$ and $x \geqq y$. Then, it discloses that by controlling the volume resistivity and surface resistivity in this way, toner images primarily transferred onto the intermediate transfer belt do not scatter and discharge naturally occurs before subsequent toner images are primarily transferred. It also discloses that the constitution of the intermediate transfer belt may be either of a single-layer structure and a multi-layer structure.

In addition, t is demanded for the electrophotographic belt to have excellent flexing resistance in order to secure good handling properties in the electrophotographic apparatus. It is also demanded for the belt to have excellent wear resistance so that as a result of wear, the surface of the electrophotographic belt for holding toner images or a transfer material is not changed in physical properties or in electrical properties required as the electrophotographic belt. As a material that may satisfy the above at a high level, for example, curable polyimide may be cited.

The curable polyimide, however, is commonly expensive. Accordingly, in order to obtain a lower-cost electrophotographic belt, the present inventors have made studies on an electrophotographic belt comprising a base layer having a good flexibility, containing a thermoplastic resin, and formed on the base layer a surface layer having good wear resistance. Specifically, they have studied how a cured resin film having a uniform thickness and good adherence to the base layer can be used as the surface layer.

As a result of the studies, the present inventors have realized that the surface layer must be formed in a thickness of 3.0 μm or less in order to prevent the surface layer from, e.g., becoming cracked when the electrophotographic belt is flexed. On the basis of such realization, the present inventors have studied how such preferable electrical properties as disclosed in the above Japanese Patent Application Laid-open No. H10-228188 can be imparted to an electrophotographic belt having on the base layer containing a thermoplastic resin a surface layer composed of a thin cured resin film. Therefore, the present inventors have attempted to add conductive particles to the surface layer so as to balance the volume resistivity and surface resistivity of the electrophotographic belt.

However, the surface resistivity of the surface layer has come to be too low (specifically, $10^7$ Ω/square). Thus, they have failed to impart to the electrophotographic belt the preferable electrical properties disclosed in the above Japanese Patent Application Laid-open No. H10-228188.

SUMMARY OF THE INVENTION

An object of the present invention is to provide an electrophotographic belt having superior flexing resistance and superior surface wear resistance and also having good electrical properties, an electrophotographic apparatus having such an electrophotographic belt, and a process for producing the electrophotographic belt.

Another object of the present invention is to provide an intermediate transfer belt having superior flexing resistance and superior surface wear resistance and also having good electrical properties.

More specifically, the present invention is an electrophotographic belt which includes a base layer containing a thermoplastic resin and having a mass loss (or "loss in mass") percentage of 0.30% or more after a Taber abrasion test (ASTM D-1175; at a load of 4.9 N and 500 revolutions) and a cured resin film formed on the base layer by coating, containing conductive particles and having a thickness of from 0.5 μm or more to 3.0 μm or less;

the cured resin film having at its surface a mass loss percentage of 0.050% or less after a Taber abrasion test (ASTM D-1175; at a load of 4.9 N and 500 revolutions); and the electrophotographic belt having volume resistivity ρv (Ωcm) and, at the surface of the cured resin film, surface resistivity ρs (Ω/square) which satisfy the following expressions (1), (2) and (3):

$$10^6 \leqq \rho v \leqq 10^{10} \quad (1),$$

$$10^8 \leqq \rho s \leqq 10^{13} \quad (2),$$

$$\rho s/\rho v \geqq 10^2 \quad (3).$$

The present invention is also an electrophotographic apparatus which comprises the above electrophotographic belt.

The present invention is still also a process for producing the above electrophotographic belt; the process including:

a base layer forming step of forming the base layer by using a thermoplastic resin; and a surface layer forming step of applying on the base layer formed by the base layer forming step a surface layer forming coating fluid which contains a monomer and/or oligomer component as a raw material for the cured resin film, conductive particles and a solvent, followed by drying and curing to form the surface layer.

The present invention is still also an intermediate transfer belt which includes a base layer containing a thermoplastic resin and having a mass loss percentage of 0.30% or more after a Taber abrasion test (ASTM D-1175; at a load of 4.9 N and 500 revolutions) and a cured resin film formed on the base layer by coating, containing conductive particles and having a thickness of from 0.5 μm or more to 3.0 μm or less;

the cured resin film having at its surface a mass loss percentage of 0.050% or less after a Taber abrasion test (ASTM D-1175; at a load of 4.9 N and 500 revolutions); and the intermediate transfer belt having volume resistivity ρv (Ωcm) and, at the surface of the cured resin film, surface resistivity ρs (Ω/square) which satisfy the following expressions (1), (2) and (3):

$$10^6 \leqq \rho v \leqq 10^{10} \quad (1),$$

$$10^8 \leqq \rho s \leqq 10^{13} \quad (2),$$

$$\rho s/\rho v \geqq 10^2 \quad (3).$$

DESCRIPTION OF THE PREFERRED EMBODIMENTS (Basic Constitution)

The electrophotographic belt of the present invention is described below in detail with reference to the drawings.

Figure 1:
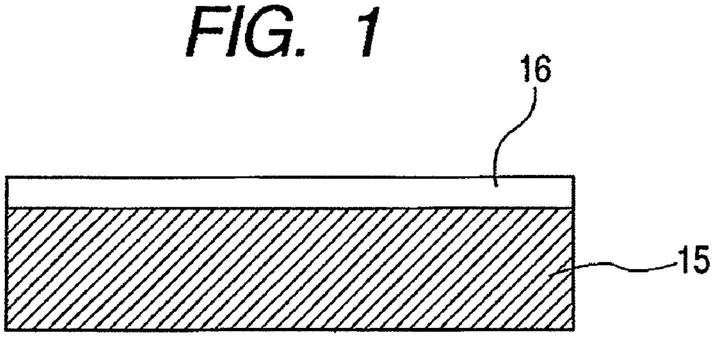
FIG. 1 is a schematic sectional view of the electrophotographic belt of the present invention.

FIG. 1 is a schematic sectional view of the electrophotographic belt of the present invention. Reference numeral 15 denotes a base layer containing a thermoplastic resin; and 16, a cured resin film formed on the base layer by coating. In this electrophotographic belt, where its volume resistivity and surface resistivity are represented by ρv (Ωcm) and ρs (Ω/square), respectively, the ρv and ρs satisfy all the following expressions (1), (2) and (3)

$$10^6 \leqq \rho v \leqq 10^{10} \quad (1),$$

$$10^8 \leqq \rho s \leqq 10^{13} \quad (2),$$

$$\rho s/\rho v \geqq 10^2 \quad (3).$$

As stated previously, according to studies made by the present inventors before arriving at the present invention, they have failed to impart electrical properties that may satisfy all the above expressions (1), (2) and (3), to the electrophotographic belt having a base layer and, formed on the base layer by coating, a surface layer composed of a cured resin film and having a thickness of 3.0 μm or less.

As to the cause thereof, the present inventors made studies in detail and, as a result of the studies, were able to have the following findings. That is, the surface resistivity of the electrophotographic belt was found to be very low because a greater part of conductive particles migrated to the vicinity of the surface of the surface layer as the solvent evaporated from a thin wet coating formed of a surface layer forming coating fluid which contained the conductive particles and was applied on the base layer.

Accordingly, the present inventors controlled the rate of evaporation of the solvent from the coating fluid applied on the base layer, so as to prevent the conductive particles from migrating to the surface of the surface layer. As a result, they found that such control kept the surface resistivity from lowering vastly and made obtainable the electrophotographic belt satisfying all the above expressions (1), (2) and (3). Thus, they have accomplished the present invention.

The constituents of the electrophotographic belt are described below in order.

(Base Layer)

The base layer may preferably be one having good flexing resistance, which may cause no cracking at its surface even when flexed. Materials usable for such a base layer may include thermoplastic resin materials as shown below, mixtures of any of these, and thermoplastic elastomers formed by any of the mixtures: Polycarbonate, polyvinylidene fluoride (PVDF), polyethylene, polypropylene, polymethylpentene-1, polystyrene, polyamide, polysulfone, polyarylate, polyethylene terephthalate, polybutylene terephthalate, polyphenylene sulfide, polyether sulfone, polyether nitrile, thermoplastic polyimide materials, polyether ether ketone, thermotropic liquid-crystal polymers, and polyamic acid.

The base layers having good flexing resistance, formed from the above materials may often have a surface having relatively low wear resistance, which has a mass loss percentage of 0.30% or more after a Taber abrasion test (ASTM D-1175; at a load of 4.9 N and 500 revolutions).

However, the formation of a surface layer described later can improve surface wear resistance required as an electrophotographic belt.

In the electrophotographic belt, in order for all the above expressions (1), (2) and (3) to be satisfied, the base layer may preferably have a volume resistivity of from $1.0\times10^8$ Ωcm or more to $1.0\times10^{11}$ Ωcm or less, and more preferably from $1.0\times10^9$ Ωcm or more to $3.0\times10^{10}$ Ωcm or less. Similarly, the base layer may also preferably have a surface resistivity of from $1.0\times10^{10}$ Ω/square or more to $1.0\times10^{13}$ Ω/square or less, and more preferably from $5.0\times10^{11}$ Ω/square or more to $3.0\times10^{12}$ Ω/square or less.

The base layer having such volume resistivity and surface resistivity may be obtained by, e.g., incorporating known conductive particles or a known ionic conducting agent in the base layer.

The base layer may also be incorporated with at least one fine powder of an organic material or an inorganic material for the purposes of effecting mechanical reinforcement, providing thermal conductivity, and so forth. As the fine powder of an organic material, for example, a condensation polyimide powder and an ionic conductor are usable. As the fine powder of an inorganic material, it is possible to use, for example, inorganic spherical fine powders such as carbon black powder, magnesium oxide powder, magnesium fluoride powder, silicon oxide powder, aluminum oxide powder, boron nitride powder, aluminum nitride powder and titanium nitride powder. As the fine powder of an inorganic material, it is also possible to use fibrous powders such as carbon fibers and glass fibers, and whiskery powders such as potassium titanate powder, silicon carbide powder and silicon nitride powder. There are no particular limitations on the particle shape, particle diameter, content and so forth of such fine powders, and these may preferably be so selected that the volume resistivity and surface resistivity of the base layer may not deviate from the above preferable range. However, taking into account the flexing resistance, strength and thermal conductivity of the base layer, the amount of any of these powders to be incorporated may preferably be from 5% by mass or more to 70% by mass or less in total, and more preferably from 5% by mass or more to 10% by mass or less, based on the mass of the binder resin thermoplastic resin material. The base layer may have a thickness of from 80 μm or more to 150 μm or less, taking into account the strength required for an electrophotographic belt.

(Surface Layer)

From the viewpoint of adherence to the base layer and thickness uniformity, the surface layer is comprised of the cured resin film formed on the base layer by coating. The surface layer provides the surface of the electrophotographic belt with good wear resistance such that the mass loss percentage after the Taber abrasion test (ASTM D-1175; at a load of 4.9 N and 500 revolutions) of the electrophotographic belt is 0.050% or less.

Such a cured resin film may be obtained by applying on the base layer a coating fluid containing an acrylic monomer (such as dipentaerythritol hexaacrylate) or a prepolymer of an acrylic resin, followed by curing. In the present invention, the cured resin film may have a thickness of from 0.5 μm or more to 3.0 μm or less, and preferably from 1.0 μm or more to 3.0 μm or less, in order that the electrophotographic belt can be provided with the given wear resistance and can fully follow the flexing of the base layer.

(Conductive Particles)

In the present invention, conductive particles are added in order that the surface layer comprised of the cured resin film can be provided with the given resistivity. As the conductive particles, any particles may be used as long as they are resistance-controllable, and may include the following: Powders such as carbon black, PAN-based carbon fibers and an expanded-graphite pulverized product; powdery, fibrous or flaky carbon-based conducting agents; powdery, fibrous or flaky metal-based conducting agents of metals such as silver, nickel, copper, zinc, aluminum, stainless steel and iron; and fine particulate metal-oxide-based conducting agents such as antimony-doped tin oxide, tin-doped indium oxide and aluminum-doped zinc oxide.

Of these, in the present invention, fine particulate metal-oxide-based conducting agents are preferred, which is effective in a small quantity and can provide the surface layer with surface smoothness. It is more preferable that the outermost particle surfaces of the fine particulate metal-oxide-based conducting agent are subjected to surface treatment with an insulating inorganic compound such as Si02 and Al203 to form thin shells thereon.

(Electrical Properties)

In the electrophotographic belt of the present invention, where its volume resistivity and surface resistivity are represented by ρv (Ωcm) and ρs (Ω/square), respectively, ρv and ρs satisfy the following expressions (1), (2) and (3):

$$10^6 \leqq \rho v \leqq 10^{10} \quad (1),$$

$$10^8 \leqq \rho s \leqq 10^{13} \quad (2),$$

$$\rho s/\rho v \geqq 10^2 \quad (3).$$

In order to impart the electrical properties that may satisfy all the above expressions (1), (2) and (3), to the electrophotographic belt having the base layer and, formed on the base layer by coating, the surface layer including a thermoplastic resin and having a thickness of from 0.5 μm or more to 3.0 μm or less, it is necessary to control, in conjunction with the addition of the conductive particles to the surface layer, the rate of evaporation of the solvent from the surface layer forming coating fluid coated on the base layer, so as to keep the conductive particles from migrating to the vicinity of the surface of the surface layer (hereinafter also referred to simply as "surface migration") in the course of drying when the surface layer is formed.

As a method for controlling the rate of evaporation of the solvent, the following may be exemplified: In a high-temperature and low-humidity environment, the surface layer forming coating fluid is applied on the base layer and the wet coating formed is dried, where the solvent can be evaporated very rapidly, thereby effectively suppressing the surface migration of the conductive particles. The high-temperature and low-humidity environment refers specifically to an environment of 35 to 45° C. and 5 to 20% RH. Also, as the surface layer forming coating fluid, it may be exemplified by a coating fluid containing, e.g., 50% by mass of an acrylic monomer, 12% by mass of conductive particles and 38% by mass of methyl isobutyl ketone.

Where methyl ethyl ketone is used as a chief solvent in the surface layer forming coating fluid, methyl ethyl ketone evaporates very rapidly even in a normal-temperature and normal-humidity environment, and hence the surface migration of the conductive particles can effectively be suppressed. The normal-temperature and normal-humidity environment refers specifically to an environment of 20 to 30° C. and 30 to 50% RH.

Thus, a low-cost electrophotographic belt can be obtained which has superior surface wear resistance and also superior electrical properties. Of course, both the temperature and humidity environment at the time of drying and the composition of the surface layer forming coating fluid may be controlled so as to suppress the surface migration of the conductive particles.

(Surface Layer Forming Coating Fluid)

The surface layer forming coating fluid used to form the surface layer contains a raw material of the cured resin film, such as an acrylic monomer or an acrylic oligomer, in order to improve the wear resistance of the surface of the electrophotographic belt, and also contains in its basic composition the conductive particles for controlling the electrical properties of the surface layer and a solvent. As described previously, in order to suppress the surface migration of the conductive particles after the surface layer forming coating fluid has been coated on the base layer, the surface layer forming coating fluid may preferably be so composed as to dry rapidly. As the solvent, it may include, e.g., isopropyl alcohol, methyl ethyl ketone, ethanol and isobutanol. In particular, in the case where the surface layer forming coating fluid coated on the base layer is dried (and cured) in an environment which is not the high-temperature and low-humidity environment, for example, the normal-temperature and normal-humidity environment, it is preferable to use methyl ethyl ketone as a chief solvent as stated above.

As the composition of the surface layer forming coating fluid, taking into account the coating properties on the base layer and the stability of the coating fluid, it is preferable that the content of the monomer and/or oligomer component, which is the raw material of the cured resin film, is from 30 to 60% by mass based on the total mass of the surface layer forming coating fluid, the content of the conductive particles is from 10 to 20% by mass based on the total mass of the surface layer forming coating fluid, and the content of the solvent is from 30 to 60% by mass based on the total mass of the surface layer forming coating fluid.

(Electrophotographic Apparatus)

Use embodiments of the electrophotographic belt of the present invention are described below.

Figure 2:
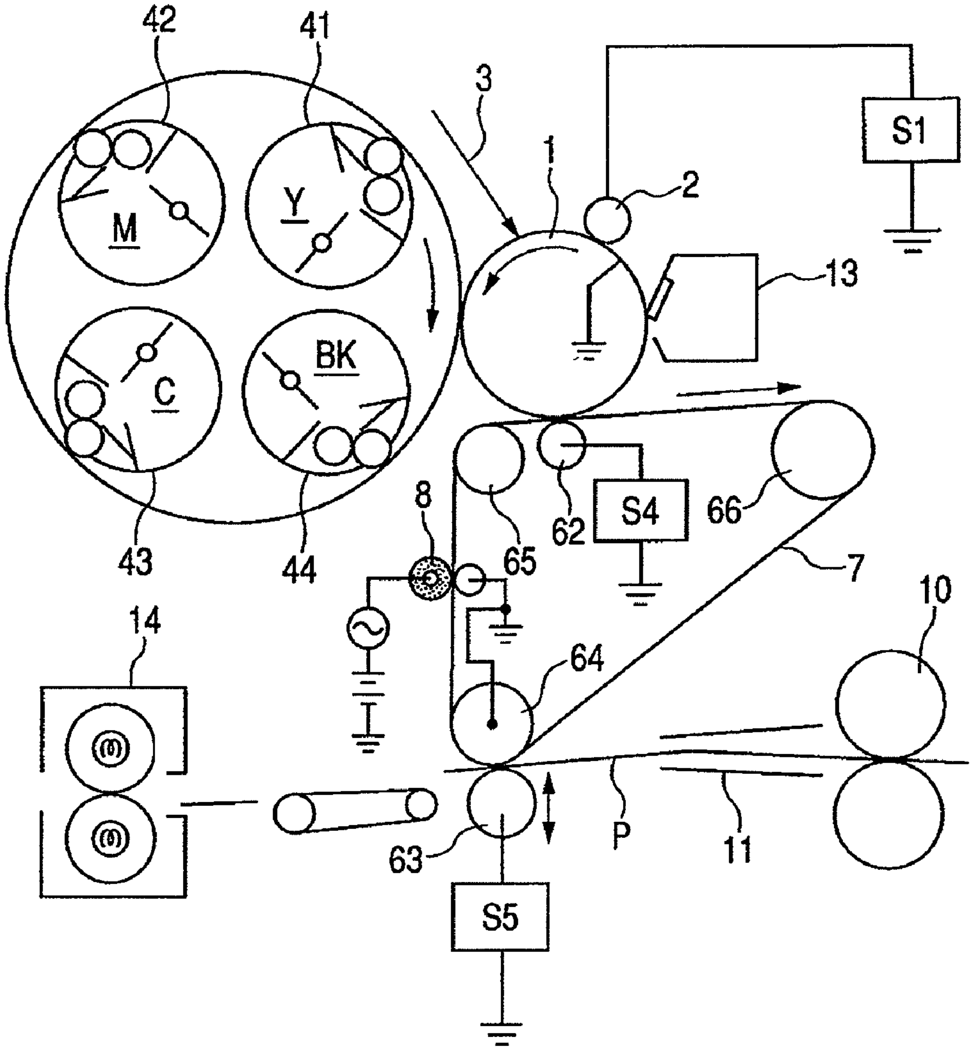
FIG. 2 is a schematic sectional view of an electrophotographic apparatus having an intermediate transfer belt.

FIG. 2 is a schematic illustration of an electrophotographic apparatus employing the electrophotographic belt of the present invention as an intermediate transfer belt.

More specifically, in FIG. 2, reference numeral 1 denotes a drum-shaped electrophotographic photosensitive member (hereinafter also referred to as "photosensitive drum"), which is rotatively driven at a given peripheral speed in the direction of an arrow. The photosensitive drum 1 is, in the course of its rotation, charged to a given polarity and potential by means of a primary charging assembly 2, and then imagewise exposed to exposure light 3 emitted from an image exposure unit (not shown).

Letter symbol S1 denotes a power source of the primary charging assembly. Thus, an electrostatic latent image is formed which corresponds to a first color component image (e.g., a yellow toner image) of the intended color image.

Next, the electrostatic latent image formed is developed by means of a first developing assembly 41 (yellow Y developing assembly) into the first-color component image (yellow toner image). At this stage, second, third and fourth developing assemblies, i.e., a magenta M developing assembly 42, a cyan C developing assembly 43 and a black BK developing assembly 44, are not operated and do not act on the photosensitive drum 1. Hence, the first-color yellow component image is not affected by the magenta developing assembly 42, cyan developing assembly 43 and black developing assembly 44.

An intermediate transfer belt 7 is fitted over and around a group of rollers 64, 65 and 66, and also is so disposed as to come into contact with the photosensitive drum 1 and rotatively driven at the same peripheral speed as the photosensitive drum 1. While passing through the nip zone formed between the photosensitive drum 1 and the intermediate transfer belt 7, the first-color yellow toner image formed on the photosensitive drum 1 is primarily transferred to the surface of the intermediate transfer belt 7. This primary transfer is performed by the aid of an electric field generated by a primary transfer bias (with a polarity opposite to that of the toner) applied from a bias power source S4 to a primary transfer roller 62.

Yellow toner not primarily transferred and remaining on the photosensitive drum 1 is removed by cleaning using a cleaning assembly 13. Subsequently, the second-color magenta toner image, the third-color cyan toner image and the fourth-color black toner image are sequentially likewise transferred and superimposed onto the intermediate transfer belt 7. Thus, synthesized color toner images corresponding to the intended full-color image are formed.

The synthesized color toner images transferred to the intermediate transfer belt 7 are secondarily transferred to a transfer material P. More specifically, the transfer material P is fed from a cassette (not shown) through a transfer material feed roller 10 and a transfer material guide 11 to the nip zone formed between the intermediate transfer belt 7 and a secondary transfer roller 63. A secondary transfer bias is simultaneously applied to the secondary transfer roller 63 from a bias power source S5, whereby the synthesized color toner images held on the intermediate transfer belt 7 are secondarily transferred to the transfer material P. The transfer material P to which the synthesized color toner images have been transferred are guided into a fixing assembly 14, where the synthesized color toner images are fixed to the transfer material P.

Toners not transferred to the transfer material P and remaining on the intermediate transfer belt 7 are charged by a charging assembly 8, then they are transferred to the photosensitive drum 1 at the nip zone formed between the photosensitive drum 1 and the intermediate transfer belt 7, and collected by the cleaning assembly 13.

Figure 3:
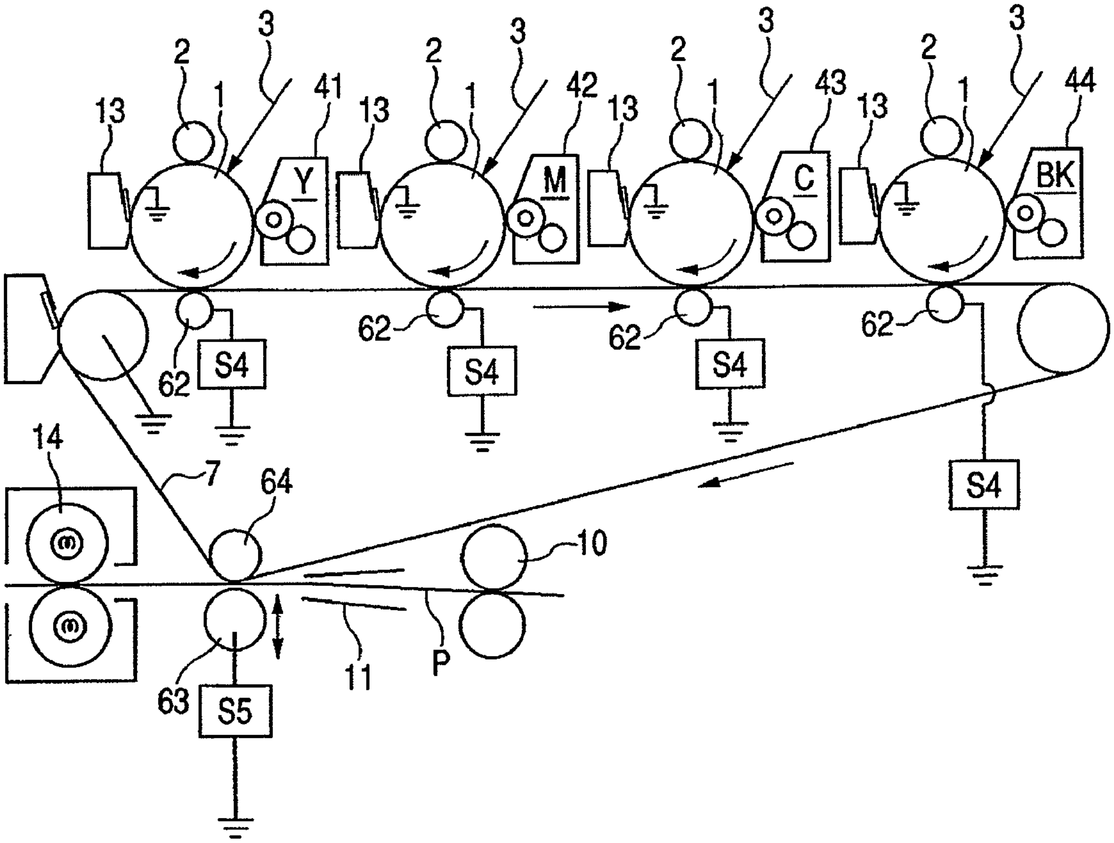
FIG. 3 is a schematic sectional view of another electrophotographic apparatus having an intermediate transfer belt.

FIG. 3 shows an image forming apparatus in which four of the photosensitive drum 1 for forming respective-color toner images are set and each of the photosensitive drums is so disposed as to come into contact with an intermediate transfer belt 7. Members corresponding to those in FIG. 2 are denoted by like reference numerals.

Figure 4:
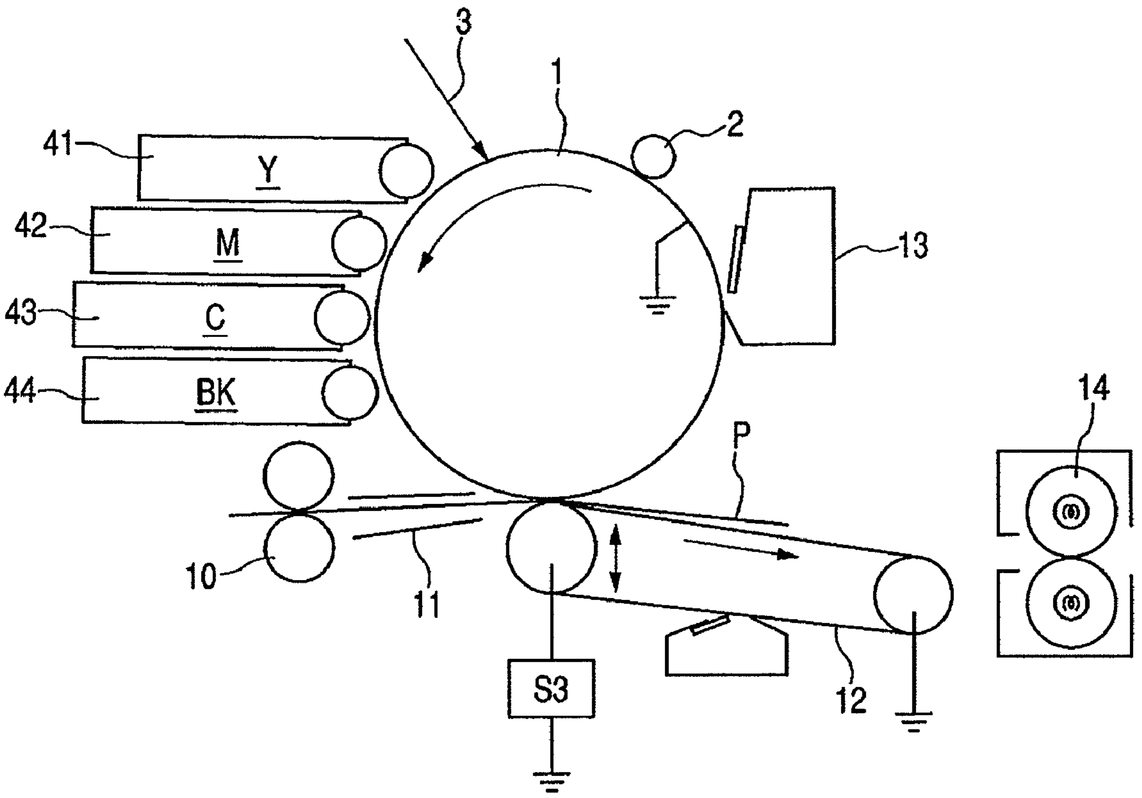
FIG. 4 is a schematic sectional view of an electrophotographic apparatus having a transfer material transport belt.
Figure 5:
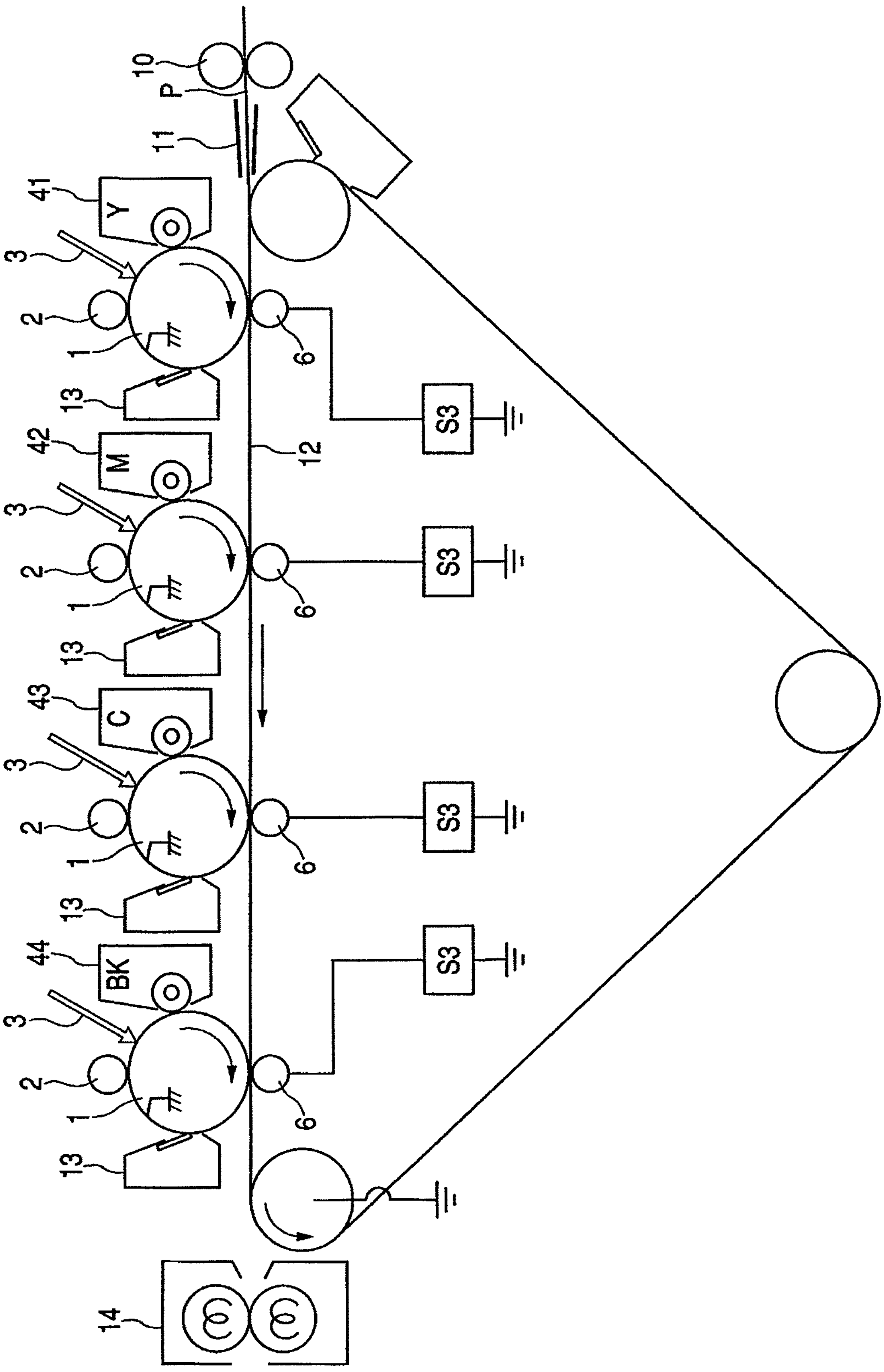
FIG. 5 is a schematic sectional view of another electrophotographic apparatus having a transfer material transport belt.

FIGS. 4 and 5 are schematic sectional views of electrophotographic apparatus each employing the electrophotographic belt as a transfer material transport belt 12. Members corresponding to those in FIG. 2 are denoted by the same reference numerals.

In FIG. 4, a transfer material P is fed from a cassette (not shown) through a transfer material feed roller 10 and a transfer material guide 11 onto the transfer material transport belt 12. Then, the transfer material P is carried on and transported by the transfer material transport belt 12, and passes through the nip zone formed between a photosensitive drum 1 and the transfer material transport belt 12, when toner images formed on the photosensitive drum 1 are transferred to the transfer material P. Letter symbol S3 denotes a power source of a transfer bias applying means. Four color toner images are transferred and superimposed, and the transfer material P on which synthesized color toner images corresponding to the intended full-color image have been formed is guided into a fixing assembly 14, where the synthesized color toner images are fixed to the transfer material P.

In FIG. 5, four of the photosensitive drum 1 for forming respective-color toner images are set and each photosensitive drums is so disposed as to form a nip with a transfer material transport belt 12. A transfer material P is fed from a cassette (not shown) passing a transfer material feed roller 10 and a transfer material guide 11 onto the transfer material transport belt 12. Then, the transfer material P is held on the transfer material transport belt 12, transported successively thereon, and passes through the nip formed between each photosensitive drum 1 and the transfer material transport belt 12, when respective-color toner images formed on the photosensitive drum 1 are transferred and superimposed onto the transfer material P. Reference numeral 6 denotes a transfer bias applying means, and letter symbol S3 denotes a power source thereof. Four color toner images are transferred and superimposed, and the transfer material P on which synthesized color toner images corresponding to the intended full-color image have been formed is guided into a fixing assembly 14, where the synthesized color toner images are fixed to the transfer material P.

EXAMPLES

The present invention is described below in greater detail by giving Examples and Comparative Examples.

In Examples and Comparative Examples, the volume resistivity ρv and the surface resistivity ρs were measured in the following way.

That is, a measurement sample of 100 mm×100 mm in size was cut out from the electrophotographic belt produced in each Example and Comparative Example, and the measurement was made after the measurement sample was beforehand left standing for 6 hours in an environment of 23° C./50% RH.

A high-resistance measuring instrument (trade name: HIRESTA UP, MCP-HT450; manufactured by Mitsubishi Chemical Corporation) was used as a measuring instrument. A ring-shaped probe (trade name: URS; diameter of center electrode: 0.59 cm; inner diameter of outside electrode: 1.1 cm; outer diameter of outside electrode: 1.78 cm; manufactured by Mitsubishi Chemical Corporation) was used as a surface electrode.

In addition, as to the volume resistivity, the measurement sample was placed on the metal surface side of REGI-TABLE UFL (trade name; manufactured by Mitsubishi Chemical Corporation), and a voltage of 100 V was applied across the center electrode of the ring-shaped probe and the metal surface of REGI-TABLE UFL. A value found after 10 seconds was regarded as a measured value.

As to the surface resistivity as well, the measurement sample was placed on the polyamide surface side of REGI-TABLE UFL (trade name; manufactured by Mitsubishi Chemical Corporation), and a voltage of 100 V was applied across the center electrode of the ring-shaped probe and the outside electrode. A value found after 10 seconds was regarded as a measured value.

In Examples and Comparative Examples, the Taber abrasion test was conducted according to ASTM D-1175, corresponding to Japanese Industrial Standards (JIS) K 7204 (1999) and using a Taber abrasion tester (trade name: TABER ABRASION TESTER; manufactured by Yasuda Seiki K. K.). CS10FA was used as an abrasion ring. The measurement was carried out at a load of 4.9 N, 500 revolutions, and 60 rpm.

Example 1

(i) Production of Base Layer

A film composed of polyvinylidene fluoride resin containing an ionic conducting agent, having a thickness of 50 μm, a volume resistivity ρv of $2.5\times10^9$ Ωcm and a surface resistivity ρs of $1.8\times10^{11}$ Ω/square, was produced by extrusion. Using this film, a cylindrical endless belt of 100 μm in thickness was produced according to the method described in Example 1 disclosed in Japanese Patent Application Laid-open No. 2002-326287. This cylindrical endless belt was used as the base layer of the electrophotographic belt. This cylindrical endless belt had the same volume resistivity and surface resistivity as those of the above film. Also, the mass loss percentage of the belt surface (the surface to be coated with the surface layer forming coating fluid described below) after the Taber abrasion test (ASTM D-1175; at a load of 4.9 N and 500 revolutions) was 0.41%.

(ii) Preparation of Surface Layer Forming Coating Fluid

In a container shielded from ultraviolet radiations, 12 parts by mass of an isopropyl alcohol sol of zinc antimonate as conductive particles (trade name of the sol: CELNAX, available from Nissan Chemical Industries, Ltd.) was mixed with 50 parts by mass of an acrylic ultraviolet-curable hard coat material containing dipentaerythritol hexaacrylate (trade name of the coat material: DESOLITE; available from JSR Corporation). Thereafter, 38 parts by mass of methyl isobutyl ketone (MIBK) was added to prepare an ultraviolet-curable resin composition. The dispersion stability of the conductive particles in the ultraviolet-curable resin composition was good.

(iii) Production of Electrophotographic Belt

In an environment of 40° C./10% RH, the surface layer forming coating fluid prepared in the above (ii) was applied by dip coating on the surface of the base layer produced in the above (i) to form a thin wet coating of the surface layer forming coating fluid. This wet coating was dried for 30 seconds in the above environment, and thereafter the coating dried was irradiated with ultraviolet rays by using a UV irradiator (trade name: UE06/81-3; manufactured by EYEGRAPHICS Co.; integral amount of light: 1,200 mJ/cm$^2$) and cured to form a cured resin film of 1.0 μm in thickness. This cured resin film serves as the surface layer of the electrophotographic belt.

Wearability of the surface of the surface layer of the electrophotographic belt (i.e., the surface of the electrophotographic belt) in this Example was evaluated by the Taber abrasion test. As a result, the mass loss percentage of this electrophotographic belt was 0%.

The volume resistivity ρv and surface resistivity ρs of the electrophotographic belt were measured with a resistance measuring instrument (trade name: HIRESTA; manufactured by Mitsubishi Chemical Corporation) and found to be as shown below, and the surface resistivity of the electrophotographic belt was kept from vastly lowering due to the surface migration of the conductive particles added.

$$\rho v=3.0\times10^9\ \Omega\text{cm},$$

$$\rho s=9.0\times10^{11}\ \Omega/\text{square},$$

$$\rho s/\rho v=3.0\times10^2.$$

Next, images were formed using the electrophotographic apparatus shown in FIG. 5, in which the above electrophotographic belt was used as the transfer material transport belt. Among the rollers the electrophotographic belt was fitted over and around, the smallest roller was 20 mm in diameter, and the severest (or smallest) internal angle of the belt placed around the roller was 60 degrees.

Conditions for the image formation are shown below.

Electrophotographic photosensitive member: Organic photosensitive member.

Dark-area potential (non-image area potential): −700 V.

Light-area potential (image area potential): −150 V.

Developer: Non-magnetic one-component developers (toners) (for all four colors).

Transfer voltage: 1.5 kV.

Process speed: 122 mm/s.

As a result, since the electrophotographic belt of Example 1 had a sufficiently low volume resistivity, charge-up did not occur. Further, since the surface resistivity of the electrophotographic belt had a great difference as compared with the volume resistivity, the toner constituting toner images on the surface of the transfer material carried on the transfer material transport belt was not scattered, and high definition images were obtained.

Moreover, in the electrophotographic apparatus of Example 1 in which the electrophotographic belt of Example 1 was set as the transfer material transport belt, any cracking or the like was not seen to occur on the transfer material carrying surface of the electrophotographic belt even after 200,000 sheets of paper were run (extensive operation).

Comparative Example 1

An electrophotographic belt was produced in the same manner as in Example 1 except that the application of the surface layer forming coating fluid on the base layer and the drying were carried out in an environment of 25° C./40% RH.

The volume resistivity ρv and surface resistivity ρs of the electrophotographic belt thus produced were as shown below. The surface resistivity of the electrophotographic belt lowered greatly as compared with the electrophotographic belt of Example 1.

$$\rho v=2.6\times10^9\ \Omega\text{cm},$$

$$\rho s=7.5\times10^8\ \Omega/\text{square},$$

$$\rho s/\rho v-3.0\times10^{-1}.$$

The reason therefor is considered to be that the coating environment was changed to the normal-temperature and normal-humidity environment and hence, in the course of drying, the solvent evaporated at a low rate from the thin wet film of the surface layer forming coating fluid coated on the base layer, so that the conductive particles migrated to surface migration.

Next, the electrophotographic belt of Comparative Example 1 was used as the transfer material transport belt of the same electrophotographic apparatus as used in Example 1, and images were formed under the same conditions as in Example 1.

As a result, the toner constituting toner images on the surface of the transfer material carried on the transfer material transport belt became scattered. As a result of visual comparison with the images in Example 1, the image quality was clearly inferior.

Example 2

An electrophotographic belt was produced in the same manner as in Example 1 except that the surface layer (cured resin film) was formed in a thickness of 3.0 μm. Evaluation was made in the same way as in Example 1.

The mass loss percentage of the electrophotographic belt of Example 2 after the Taber abrasion test was 0%. The volume resistivity ρv and surface resistivity ρs of the electrophotographic belt of Example 2 were as shown below, and the surface resistivity was kept from vastly lowering, as with the electrophotographic belt of Example 1.

$$\rho v=6.5\times10^{9}\ \Omega/\text{cm},$$

$$\rho s=1.5\times10^{12}\ \Omega/\text{square},$$

$$\rho s/\rho v=2.3\times10^{2}.$$

Next, the electrophotographic belt of Example 2 was used as the transfer material transport belt of the same electrophotographic apparatus as used in Example 1, and images were formed under the same conditions as in Example 1.

As a result, as with Example 1, the toner constituting toner images on the surface of the transfer material carried on the transfer material transport belt was not scattered, and high definition images were obtained.

In the electrophotographic apparatus of Example 2, any cracking or the like was not seen to occur on the transfer material carrying surface of the electrophotographic belt even after 200,000 sheets of paper were run.

Example 3

An electrophotographic belt of Example 3 was produced in the same manner as in Example 1 except that the surface layer forming coating fluid, the application of the surface layer forming coating fluid on the base layer and the conditions for drying were as shown below.

(i) Preparation of Surface Layer Forming Coating Fluid:

12 parts by mass of an isopropyl alcohol sol of zinc antimonate as conductive particles (trade name of the sol: CELLNAX, available from Nissan Chemical Industries, Ltd.) was mixed with 50 parts by mass of an acrylic ultraviolet-curable hard coat material containing dipentaerythritol hexaacrylate (trade name of the coat material: DESOLITE; available from JSR Corporation). Thereafter, 38 parts by mass of methyl ethyl ketone (MEK) was added to obtain an ultraviolet-curable resin composition.

(ii) Production of Electrophotographic Belt:

In an environment of 25° C./40% RH, the surface layer forming coating fluid prepared in the above (i) was applied on the surface of the base layer produced in the same way as in the procedure (i) in Example 1. The wet coating formed was dried, and thereafter the coating dried was irradiated with ultraviolet rays to form a surface layer (cured resin film), obtaining the electrophotographic belt of Example 3.

Wearability of the surface of the electrophotographic belt of Example 3 was evaluated by the Taber abrasion test. As a result, the mass loss percentage of this electrophotographic belt was 0%.

The volume resistivity ρv and surface resistivity ρs of the electrophotographic belt of Example 3 were as shown below.

$$\rho v=3.8\times10^{9}\ \Omega/\text{cm},$$

$$\rho s=5.0\times10^{11}\ \Omega/\text{square},$$

$$\rho s/\rho v=1.3\times10^{2}.$$

As shown above, in Example 3, in place of the methyl isobutyl ketone used in Example 1, methyl ethyl ketone having a lower boiling point was used as the chief solvent of the surface layer forming coating fluid. In virtue of this solvent, the thin wet film of the surface layer forming coating fluid applied on the base layer dried rapidly even in the same environment of 25° C./40% RH as in the case of the application of the surface layer forming coating fluid and the drying conditions in Comparative Example 1. As a result, the surface migration of the conductive particles was suppressed in the course of the drying of the wet coating of the surface layer forming coating fluid, and the surface resistivity of the electrophotographic belt was able to be effectively kept from vastly lowering as seen in Comparative Example 1.

Next, the electrophotographic belt of Example 3 was used as the transfer material transport belt of the same electrophotographic apparatus as used in Example 1, and images were formed under the same conditions as in Example 1.

As a result, as with Example 1, the toner constituting toner images on the surface of the transfer material carried on the transfer material transport belt was not scattered, and high definition images were obtained.

In the electrophotographic apparatus of Example 3, any cracking or the like was not seen to occur on the transfer material carrying surface of the electrophotographic belt even after 200,000 sheets of paper were run.

Comparative Example 2

An electrophotographic belt was produced in the same manner as in Comparative Example 1 except that the surface layer (cured resin film) of 1.0 pm in thickness was formed in a thickness of 10.0 pm.

Wearability of the surface of the electrophotographic belt of Comparative Example 2 was evaluated by the Taber abrasion test. As a result, the mass loss percentage of this electrophotographic belt was 0%.

Since the thickness of the surface layer (cured resin film) of the electrophotographic belt of Comparative Example 2 was as large as 10 μm, the conductive particles in the thin wet coating of the surface layer forming coating fluid were not able to migrate to the vicinity of the surface of the surface layer (cured resin film) even in the environment of 25° C./40% RH, so that as far as the volume resistivity ρv and the surface resistivity ρs were concerned, as shown below, the electrophotographic belt produced was provided with all the electrical properties required for the electrophotographic belt of the present invention.

$$\rho v=8.0\times10^{9}\ \Omega\cdot\text{cm},$$

$$\rho s=2.0\times10^{12}\ \Omega/\text{square},$$

$$\rho s/\rho v=2.5\times10^{2}.$$

The electrophotographic belt of Comparative Example 2 was used as the transfer material transport belt of the same electrophotographic apparatus as used in Example 1, and images were formed under the same conditions as in Example 1.

As a result, the transfer material carrying surface of the transfer material transport belt was seen to become cracked after 500 sheets of paper were run. That is, it was ascertainable that since the surface layer (cured resin film) was formed in a large thickness, such a high-hardness surface layer (cured resin film) lost performance following the flexing of the base layer, resulting in a lowering of belt durability against extensive operation.

TABLE 1

| | Example 1 | Comparative Ex. 1. | Example 2 | Example 3 | Comparative Ex. 2 |
|---|---|---|---|---|---|
| Chief Solvent: | MIBK | MIBK | MIBK | MEK | MIBK |
| Coating environment: | 40° C./10% | 25° C./40% | 40° C./10% | 25° C./40% | 40° C./10% |
| Surface layer thickness (μm): | 1 | 1 | 3 | 1 | 10 |
| ρv (Ωcm): | $3.0 \times 10^9$ | $2.6 \times 10^9$ | $6.5 \times 10^9$ | $3.8 \times 10^9$ | $8.0 \times 10^9$ |
| ρs (Ωsquare): | $9.0 \times 10^{11}$ | $7.5 \times 10^8$ | $1.5 \times 10^{12}$ | $5.0 \times 10^{11}$ | $2.0 \times 10^{12}$ |
| ρs/ρv: | $3.0 \times 10^2$ | $3.0 \times 10^{-1}$ | $2.3 \times 10^2$ | $1.3 \times 10^2$ | $2.5 \times 10^2$ |

According to the present invention, an electrophotographic belt can be provided having superior flexing resistance and superior surface wear resistance in addition to good electrical properties, an electrophotographic apparatus having such an electrophotographic belt, and a process for producing the electrophotographic belt.

According to the present invention, an intermediate transfer belt also can be provided having superior flexing resistance and superior surface wear resistance in conjunction with good electrical properties.

This application claims priority from Japanese Patent Application No. 2005-127976 filed on Apr. 26, 2005, which is hereby incorporated by reference herein.

What is claimed is:

1. A process for producing an electrophotographic belt comprising the steps of:

forming a base layer comprising a thermoplastic resin; and forming a surface layer comprising a cured resin film by applying on the base layer a surface layer forming coating fluid which contains a monomer and/or oligomer component as a raw material for the cured resin film, conductive particles and a solvent, followed by drying and curing to form the surface layer, wherein the monomer and/or oligomer component is dipentaerythritol hexaacrylate.

2. The process according to claim 1, wherein the surface layer forming coating fluid contains the monomer and/or oligomer component in an amount of from 30 to 60% by mass, the conductive particles in an amount of from 10 to 20% by mass, and the solvent in an amount of from 30 to60% by mass.

3. The process according to claim 1, wherein the step of forming the surface layer is carried out in an environment of a temperature of from 35 to 45° C. and a humidity of from 5 to 20%RH.

4. The process according to claim 1, wherein the solvent contains methyl isobutyl ketone.

5. The process according to claim 1, wherein the step of forming the surface layer is carried out in an environment of a temperature from 35 to 45° C. and a humidity from 5 to 20%RH, and the solvent contains methyl isobutyl ketone.

* * * * *